(12) United States Patent
Villars

(10) Patent No.: US 10,339,610 B2
(45) Date of Patent: Jul. 2, 2019

(54) METHOD AND SYSTEM FOR MAKING A TARGETED OFFER TO AN AUDIENCE

(71) Applicant: MASTERCARD INTERNATIONAL INCORPORATED, Purchase, NY (US)

(72) Inventor: Curtis Villars, Chatham, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 884 days.

(21) Appl. No.: 13/866,794

(22) Filed: Apr. 19, 2013

(65) Prior Publication Data

US 2014/0316888 A1 Oct. 23, 2014

(51) Int. Cl.
G06Q 30/00 (2012.01)
G06Q 50/00 (2012.01)
G06Q 30/02 (2012.01)

(52) U.S. Cl.
CPC ......... G06Q 50/01 (2013.01); G06Q 30/0269 (2013.01)

(58) Field of Classification Search
None
See application file for complete search history.

(56) References Cited

U.S. PATENT DOCUMENTS

| | | | |
|---|---|---|---|
| 7,974,889 B2 | 7/2011 | Raimbeault | |
| 8,108,406 B2 | 1/2012 | Kenedy et al. | |
| 8,380,559 B2 | 2/2013 | Crotty et al. | |
| 2003/0009369 A1* | 1/2003 | Gorenstein | G06Q 30/02 705/7.33 |
| 2010/0262456 A1 | 10/2010 | Feng et al. | |
| 2011/0066497 A1 | 3/2011 | Gopinath et al. | |
| 2011/0282750 A1 | 11/2011 | Rosen | |
| 2012/0166271 A1* | 6/2012 | Wofford | G06Q 30/0242 705/14.44 |
| 2012/0253923 A1 | 10/2012 | Durvasula et al. | |
| 2012/0271691 A1 | 10/2012 | Hammad et al. | |

(Continued)

OTHER PUBLICATIONS

International Search Report dated Sep. 22, 2014 for PCT application No. PCT/US2014/034773.

(Continued)

*Primary Examiner* — Michael W Schmucker
(74) *Attorney, Agent, or Firm* — Ohlandt, Greeley, Ruggiero & Perle, L.L.P.

(57) ABSTRACT

A system and method for making a targeted offer to an audience of a population of entities involves: retrieving a first set of information attributable to a first plurality of entities; generating a plurality of interaction associations from the first set of information; and conveying to a third party one or more interaction associations to enable the third party to identify a second set of information attributable to a second plurality of entities. The second set of information has matching activities and characteristics to the activities and characteristics of the interaction associations. The second plurality of entities has a propensity to carry out certain activities based on the activities criteria and/or characteristics criteria used in forming the interaction associations, to enable a targeted offer to be made to an audience of the second plurality of entities.

26 Claims, 7 Drawing Sheets

(56) References Cited

U.S. PATENT DOCUMENTS

| | | | | |
|---|---|---|---|---|
| 2012/0278177 A1* | 11/2012 | Bender | ............... | G06Q 30/06 705/14.66 |
| 2013/0006768 A1 | 1/2013 | Rothman et al. | | |
| 2013/0024242 A1 | 1/2013 | Villars et al. | | |
| 2013/0024274 A1 | 1/2013 | Villars | | |
| 2013/0035985 A1 | 2/2013 | Gillbert | | |
| 2013/0054376 A1 | 2/2013 | Ross et al. | | |

OTHER PUBLICATIONS

Written Opinion dated Sep. 22, 2014 for PCT application No. PCT/US2014/034773.

* cited by examiner

METHOD AND SYSTEM FOR MAKING A TARGETED OFFER TO AN AUDIENCE

BACKGROUND OF THE DISCLOSURE

1. Field of the Disclosure

The present disclosure relates to a method and system for making a targeted offer to an audience, specifically for identifying ideal consumers for marketing purposes through the generation of interaction associations that are based upon behavioral information and intent of a first plurality of entities, and predicting behavior and intent of a second plurality of entities based upon the interaction associations.

2. Description of the Related Art

Oftentimes, merchants offer products and services to customers based on the customer's immediate expressed need. For example, a customer needs a car and a car dealer offers to sell the customer a car. The customer now has a car that needs to be insured and begins to look for an insurance provider. An insurance provider becomes aware of the customer's need when the customer calls and offers the customer automobile insurance. However, if the merchant is unaware of the customer's specific need and the customer does not express the need directly to the merchant, the merchant may miss an opportunity to provide the customer with products or services that the merchant is prepared to provide. Further, the customer may miss an opportunity to be offered products and services that the customer is not yet aware that he or she needs, but that the merchant anticipates the customer will need based on the merchant's understanding of customers it has encountered under similar circumstances.

It may be possible to predict the products or services a customer will be willing to purchase based on the customer's personal circumstances. A merchant can use its experience in offering products or services to customers with similar personal circumstances to predict the products or services that other customers may be interested in purchasing. Accordingly, a system that could analyze a customer's personal circumstances would allow a merchant to predict the products or services that may be desirable to the customer and allow a merchant to offer the products or services to the customer as the customer is recognizing his or her own need. This can help a merchant to expand its relationship with existing customers by timely offering new products or services to customers at the time the customer is most likely to be interested in purchasing the new products or services.

Additionally, there are times that a specific merchant has access to information about a customer, based on the merchant's prior dealings with the customer, regarding a customer's personal circumstances that are not readily available to other merchants that have a business relationship with the first merchant. For instance, a financial institution may have access to certain customer data that indicates a spending behavior that is not apparent to one of the financial institution's retail partners. Because the retail partner is not aware of the customer's personal circumstances, it is not able to tailor its offer of products or services to suit the customer's present or imminent need and the customer may receive offers that are not relevant to her circumstances and miss the opportunity to purchase products or services that are more relevant.

Recent years have seen a vast expansion of the use of social networks to connect individuals, access information and communicate with groups of people that share similar backgrounds, interests or characteristics. The rise of social networks presents an opportunity for merchants to both identify information about their customers and to communicate offers for products and services to customers based on available information regarding the customer's needs.

Therefore, a need exists for a system that can analyze a customer's personal circumstances, including data from a customer's social network, and identify customer activities and circumstances that may represent an opportunity for a merchant to offer products or services to the customer that are specifically tailored to the customer's upcoming need or desire and communicate the offers to the customer.

SUMMARY OF THE DISCLOSURE

This disclosure relates to a method and system for making a targeted offer to an audience. In particular, this disclosure relates to identifying ideal consumers for marketing purposes through the generation of interaction associations that are based upon behavioral information and intent of a first plurality of entities, and predicting behavior and intent of a second plurality of entities based upon the interaction associations.

There is provided a method for making a targeted offer to an audience of a population of entities. The method comprises: retrieving, from one or more databases, a first set of information including activities and characteristics attributable to a first plurality of entities; generating a plurality of interaction associations based on at least one of selected activities criteria and selected characteristics criteria from the first set of information; and conveying to a third party one or more interaction associations to enable the third party to identify a second set of information including activities and characteristics attributable to a second plurality of entities. The second set of information has matching activities and characteristics to the activities and characteristics of the interaction associations. The second plurality of entities has a propensity to carry out certain activities based on the activities criteria and/or characteristics criteria used in forming the interaction associations, to enable a targeted offer to be made to an audience of the second plurality of entities.

There is also provided a method for making a targeted offer to an audience within a social network. The method comprises: retrieving, from one or more databases, a first set of information including activities and characteristics attributable to a first plurality of entities; generating a plurality of interaction associations based on at least one of selected activities criteria and selected characteristics criteria from the first set of information; and conveying to a social network one or more interaction associations to enable the social network to identify a second set of information including activities and characteristics attributable to a second plurality of entities within the social network. The second set of information has matching activities and characteristics to the activities and characteristics of the interaction associations. The second plurality of entities has a propensity to carry out certain activities based on the activities criteria and/or characteristics criteria used in forming the interaction associations, to enable a targeted offer to be made to an audience of the second plurality of entities within the social network.

There is further provided a system for making a targeted offer to an audience of a population of entities. The system comprises: one or more databases configured to store a first set of information including activities and characteristics attributable to a first plurality of entities; a processor configured to generate a plurality of interaction associations based on at least one of selected activities criteria and selected characteristics criteria from the first set of information; and convey to a third party one or more interaction associations to enable the third party to identify a second set of information including activities and characteristics attributable to a second plurality of entities. The second set of information has matching activities and characteristics to the activities and characteristics of the interaction associations. The second plurality of entities has a propensity to carry out certain activities based on the activities criteria and/or characteristics criteria used in forming the interaction associations, to enable a targeted offer to be made to an audience of the second plurality of entities.

There is yet further provided a system for making a targeted offer to an audience within a social network. The system comprises: one or more databases configured to store a first set of information including activities and characteristics attributable to a first plurality of entities; a processor configured to generate a plurality of interaction associations based on at least one of selected activities criteria and selected characteristics criteria from the first set of information; and convey to a social network one or more interaction associations to enable the social network to identify a second set of information including activities and characteristics attributable to a second plurality of entities. The second set of information has matching activities and characteristics to the activities and characteristics of the interaction associations. The second plurality of entities has a propensity to carry out certain activities based on the activities criteria and/or characteristics criteria used in forming the interaction associations, to enable a targeted offer to be made to an audience of the second plurality of entities.

There is still further provided a method for generating one or more interaction associations. The method comprises: retrieving, from one or more databases, a first set of information including activities and characteristics attributable to a first plurality of entities; and generating one or more interaction associations based on at least one of selected activities criteria and selected characteristics criteria from the first set of information. The one or more interaction associations are conveyed to a third party to enable the third party to identify a second set of information including activities and characteristics attributable to a second plurality of entities. The second set of information has matching activities and characteristics to the activities and characteristics of the interaction associations. The second plurality of entities has a propensity to carry out certain activities based on the activities criteria and/or characteristics criteria used in forming the interaction associations, to enable a targeted offer to be made to an audience of the second plurality of entities.

The present disclosure provides a method for generating one or more interaction associations. The method comprises: retrieving, from one or more databases, a first set of information including activities and characteristics attributable to a first plurality of entities; and generating one or more interaction associations based on at least one of selected activities criteria and selected characteristics criteria from the first set of information. The one or more interaction associations are conveyed to a social network to enable the social network to identify a second set of information including activities and characteristics attributable to a second plurality of entities. The second set of information has matching activities and characteristics to the activities and characteristics of the interaction associations. The second plurality of entities has a propensity to carry out certain activities based on the activities criteria and/or characteristics criteria used in forming the interaction associations, to enable a targeted offer to be made to an audience of the second plurality of entities.

BRIEF DESCRIPTION OF THE DRAWINGS

A component or a feature that is common to more than one figure is indicated with the same reference number in each figure.

DESCRIPTION OF THE PREFERRED EMBODIMENT

Figure 1:
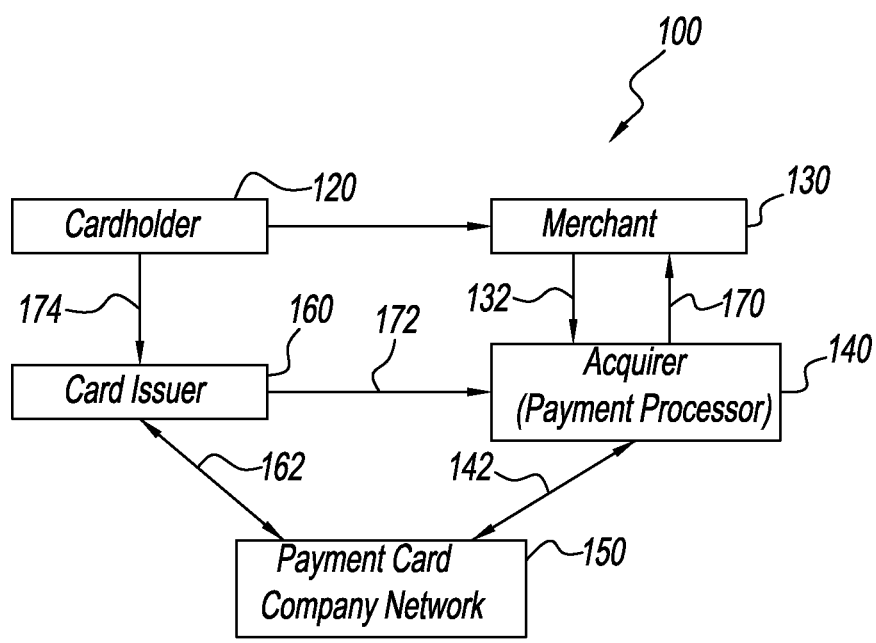
FIG. 1 is a block diagram illustrating a high-level view of system architecture of a financial transaction processing system in accordance with exemplary embodiments.

Embodiments of the present disclosure now may be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, entities may include one or more persons, organizations, businesses, institutions and/or other entities such as financial institutions, services providers etc. that implement one or more portions of one or more of the embodiments described and/or contemplated herein. In particular, entities may include a person, business, school, club, fraternity or sorority, an organization having members in a particular trade or profession, sales representative for particular products, charity, not-for-profit organization, labor union, local government, government agency, or political party.

It will also be understood that "social network" as used herein, generally refers to any social structure made up of individuals (or organizations) which are connected by one or more specific types of interdependency, such as kinship, friendship, common interest, financial exchange, working relationship, dislike, relationships, beliefs, knowledge, prestige, geographic proximity, etc. The social network may be a web-based social structure or a non-web-based social structure. In some embodiments, the social network may be inferred from financial transaction behavior, mobile device behaviors, etc. The social network may be a network unique to the disclosure or may incorporate already-existing social networks, such as Facebook®, Twitter®, Linkedin®, YouTube®, MySpace® as well as any one or more existing web logs or "blogs," forums and other social spaces.

The steps and/or actions of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Computer program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Embodiments of the present disclosure are described herein with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the disclosure.

Thus, apparatus, systems, methods and computer program products are herein disclosed to identify, analyze, extract and correlate consumer activities and characteristics that represent an opportunity to target offer products or services to the consumer and for communicating the target offers to the consumer, and also an opportunity for predicting consumer behavior and intent. Embodiments of the present disclosure will leverage the information available to identify data that is indicative of a customer's activities and characteristics and to predict consumer behavior and intent based on those activities and characteristics. Such activities and characteristics may include, but are not limited to, spending behavior, age, gender, residence, graduation from college, a new job, marriage, the birth of a child, the purchase of a house, the purchase of a car, a member of the household starting college, etc. By identifying and analyzing consumer activities and characteristics, one can offer products and services that are relevant to the consumer's needs.

Referring to the drawings and, in particular, FIG. 1, there is shown a four party payment (credit, debit or other) card system generally represented by reference numeral 100. In card system 100, cardholder 120 submits the payment card to the merchant 130. The merchant's point of sale (POS) device communicates 132 with his acquiring bank or acquirer 140, which acts as a payment processor. The acquirer 140 initiates, at 142, the transaction on the payment card company network 150. The payment card company network 150 (that includes the financial transaction processing company) routes, via 162, the transaction to the issuing bank or card issuer 160, which is identified using information in the transaction message. The card issuer 160 approves or denies an authorization request, and then routes, via the payment card company network 150, an authorization response back to the acquirer 140. The acquirer 140 sends approval to the POS device of the merchant 130. Thereafter, seconds later, the cardholder completes the purchase and receives a receipt.

The account of the merchant 130 is credited, via 170, by the acquirer 140. The card issuer 160 pays, via 172, the acquirer 140. Eventually, the cardholder 120 pays, via 174, the card issuer 160.

In accordance with the method of this disclosure, information that is stored in one or more databases may be retrieved (e.g., by a processor). The information can contain, for example, a first set of information including activities and characteristics attributable to a first plurality of entities. Illustrative information of the entities can include, for example, financial, demographic (e.g., age and gender), geographic (e.g., zip code and state or country of residence), and the like. In an embodiment, all of the information stored in one or more databases may be retrieved. In another embodiment, only a single entry in the one or more databases may be retrieved. The retrieval of information may be performed a single time, or may be performed multiple times. In an exemplary embodiment, only information pertaining to a specific interaction association may be retrieved from the one or more databases.

In accordance with the method of this disclosure, a plurality of interaction associations are generated based on at least one of selected activities criteria and selected characteristics criteria from the first set of information. Interaction associations may be selected based on the information that was obtained and stored in the one or more databases. The selection of information for representation in the interaction association or interaction associations may be different in every instance. In one embodiment, all of the information stored in the one or more databases may be used for selecting interaction associations. In an alternative embodiment, only a portion of the information may be used. The selection of interaction associations may be based on specific criteria.

Interaction associations are generated from the information obtained from the one or more databases. The information is analyzed, extracted and correlated by, for example, a financial transaction processing company (e.g., a payment card company), and can include financial account information of the entities in the interaction associations, performing statistical analysis on financial account information, finding correlations between account information and consumer behaviors, predicting future consumer behaviors based on account information, relating information on a financial account with other financial accounts, or any other method of review suitable for the particular application of the data, which will be apparent to persons having skill in the relevant art.

The interaction associations may be transmitted to a third party (e.g., a social network) in accordance with this disclosure. The transmittal to a third party may include an analysis of selected interaction associations or any other suitable information. One or more interaction associations can be conveyed to a third party to enable the third party to identify a second set of information including activities and characteristics attributable to a second plurality of entities. The second set of information can have matching activities and characteristics to the activities and characteristics of the interaction associations. The second plurality of entities can have a propensity to carry out certain activities based on the activities criteria and/or characteristics criteria used in forming the interaction associations. This enables a targeted offer to be made to an audience of the second plurality of entities. The transmittal may be performed by any suitable method as will be apparent to persons having skill in the relevant art.

As used herein, "interaction association(s)" is a representation of selected activities criteria and selected characteristics criteria of a group of consumers that can be valuable to advertisers, marketers, etc. Interaction associations may be given a minimum or a maximum size. A minimum size of an interaction association would be small enough to provide the granularity needed in a particular circumstance. In some instances, the size of an interaction association may be dependent on the application. As noted elsewhere, the entities in an interaction association that is used to form an audience might not be members of a resulting audience at all. In one embodiment, an interaction association may include at least ten unique entities.

Interaction associations may be defined based on geographical or demographical information, such as age, gender, income, marital status, postal code, income, spending propensity, familial status, etc. In some embodiments, interaction associations may be defined by a plurality of geographical and/or demographical categories. For example, an interaction association may be defined for any cardholder with an income between $50,000 and $74,999, that is between the ages of 20 and 29, and is single.

Interaction associations may also be based on behavioral variables. For example, one or more databases may store information relating to financial transactions. The information may be used to determine an individual's likeliness to spend. An individual's likeliness to spend may be represented generally, or with respect to a particular industry (e.g., electronics), retailer (e.g., Macy's®), brand (e.g., Apple®), or any other criteria which may be suitable as will be apparent to persons having skill in the relevant art. An individual's behavior may also be based on additional factors such as time, location, season, etc. For example, an interaction association may be based on consumers who are likely to spend on electronics during the holiday season, or on consumers whose primary expenses are in a suburb, but are likely to spend on restaurants located in a major city. The factors and behaviors identified and used to define interaction associations may vary widely and may be based on the application of the information.

Behavioral variables may also be applied to generated interaction associations based on the attributes of the entities in the interaction association. For example, an interaction association of specific geographical and demographical attributes (e.g., single males in a particular postal code between the ages of 26-30 with an income between $100,000 and $149,999) may be analyzed for spending behaviors. Results of the analysis may be assigned to the interaction association. For example, the above interaction association may be analyzed and reveal that the entities in the interaction association have a high spending propensity for electronics and may be less likely to spend money during the month of February.

In an embodiment, the information retrieved from the one or more databases can be analyzed to determine behavioral information of a first plurality of entities. Also, information related to an intent of the first plurality of entities can be extracted from the behavioral information. The interaction associations can be based upon the behavioral information of the first plurality of entities and the intent of the first plurality of entities. The interaction associations can be capable of predicting behavior and intent in the second plurality of entities.

Interaction associations can be developed, for example, to examine spend behaviors and create spend associations. A spend association can be a set of spend behaviors that predict another spend behavior. For example, people that tend to purchase jewelry display the following spend behaviors: spend at Macy's®, travel on cruise ships, go to the movie theaters once a month, etc.

Figure 2:
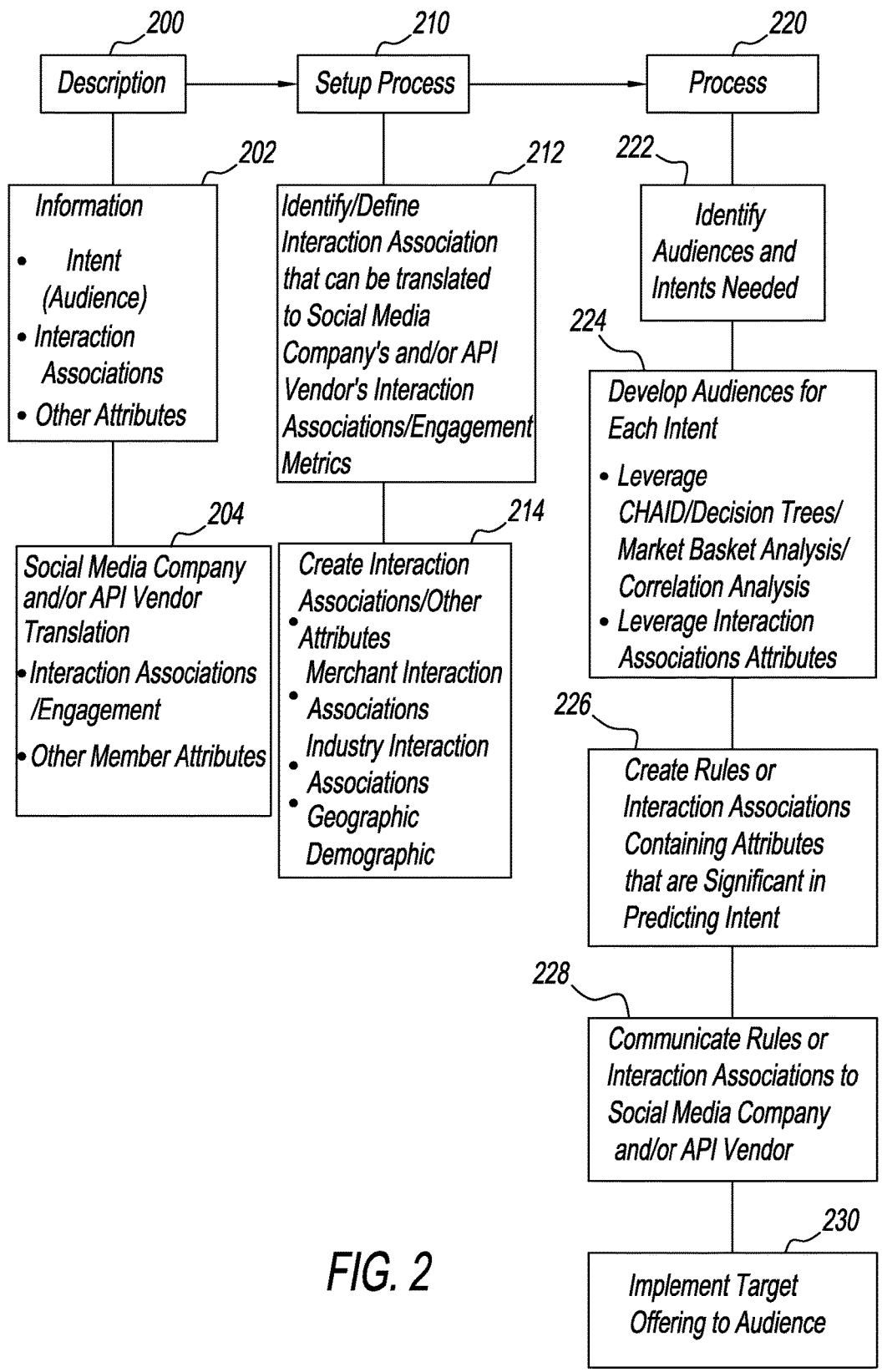
FIG. 2 is a flow chart illustrating a method for making a targeted offer to an audience of a population of entities in accordance with exemplary embodiments of this disclosure.

An interaction association method is a preferred embodiment of this disclosure. Referring to FIG. 2, the method involves developing a description 200 of information 202 (e.g., intent (audience), interaction associations, other payment card member attributes) and a third party translation 204 (e.g., social media company or other API vendor). The method also involves setup 210 in which a financial transaction processing company (e.g., a payment card company) and a third party (e.g., social media company or other API vendor), for example, identify and define interaction associations 212 that can be translated to the third party's interaction associations and engagement metrics, and also creating interaction associations and other attributes 214.

The method further involves, for example, a financial transaction processing company identifying audiences and intents, developing audiences for each intent, creating rules or interaction associations containing interaction association attributes that are significant in predicting intent, and communicating the rules or interaction associations to the third party (e.g., social media company or other API vendor).

In developing a description of information, intent (audience), interaction associations, and other payment card member attributes are considered. Developing intent of audiences involves models that predict specific spend behavior in the future and desirable spend behaviors. Examples include as follows: likely to purchase at Macy's® in the next 2 weeks; likely to spend at least $100 in consumer electronics in the next 30 days; likely to purchase a car in the next 60 days; likely to be interested in golfing; likely to be up for a cell phone renewal in the next 60 days; likely to be a business traveler; and the like.

Interaction associations can equate to purchase behaviors. There can be different degrees of interaction associations with the ultimate interaction association being a purchase. An example using Macy's® is as follows: an extreme interaction association is a consumer purchasing something once a week at Macy's® and spending five times what the average customer spends; a medium interaction association is a consumer purchasing something at Macy's® once a month and spending twice what the average customer spends; and a low interaction association is a consumer purchasing something at Macy's® once a year and spending what the average customer spends.

There is the potential for numerous interaction associations including, for example, industries (consumer electronics, QSR), categories (online spend, cross border), geography spend (spend in New York City, spend in London), geography residence (live in New York City, live in Seattle), day/time spend (weekday spend, lunch time spend), calendar spend (spend a lot around Christmas, spend a lot on flowers before Valentine's Day), top number of merchants, etc.

Other cardholder attributes part of the description include, for example, geography (zip code, state or country), and demographics (age, gender, etc.).

Also, in developing a description of information, the third party (e.g., social media or other API vendor) translation is considered. The third party identifies interaction associations and engagement metrics that complement the interaction associations of the other entity (e.g., a financial transaction processing company). The interaction associations and engagement metrics can include, for example, the following: individual actually likes a merchant; individual visits a merchant's Facebook® page; individual engages on merchant's Facebook® page (comments, forwards information to a friend); and others measures of engagement. Other interaction associations and engagement metrics include, for example, social media company member attributes (e.g., geography such as zip code and state or country and demographics, such as age and gender).

As an example, a financial transaction processing company can engage a social media company to identify and define interaction associations that can be translated to the social media company's interaction associations and engagement metrics. The creation of interaction associations and other attributes can include, for example, merchant interaction associations, industry interaction associations, geographic interaction associations, and demographic interaction associations.

For merchant interaction associations, the top 500 merchants, for example, can be identified to create merchant interaction association indicators. Merchant interaction associations can include, for example, metrics (deciles) such as dollars spend, number of transactions, share within the industry, and share of total spend. Deciles can be used to allow for greater flexibility. Merchant interaction associations can also include multiple time periods, e.g., 12 months and 3 months.

For industry interaction associations, the top 100 industries, for example, can be identified to create industry interaction association indicators. Industry interaction associations can include, for example, metrics (deciles) such as dollars spend, number of transactions, share within the industry, and share of total spend. Deciles can be used to allow for greater flexibility. Industry interaction associations can also include multiple time periods, e.g., 12 months and 3 months.

Geographic interaction associations include, for example, zip code, state and country of residence, etc. Demographic interaction associations include, for example, age groups, gender, etc.

Figure 3:
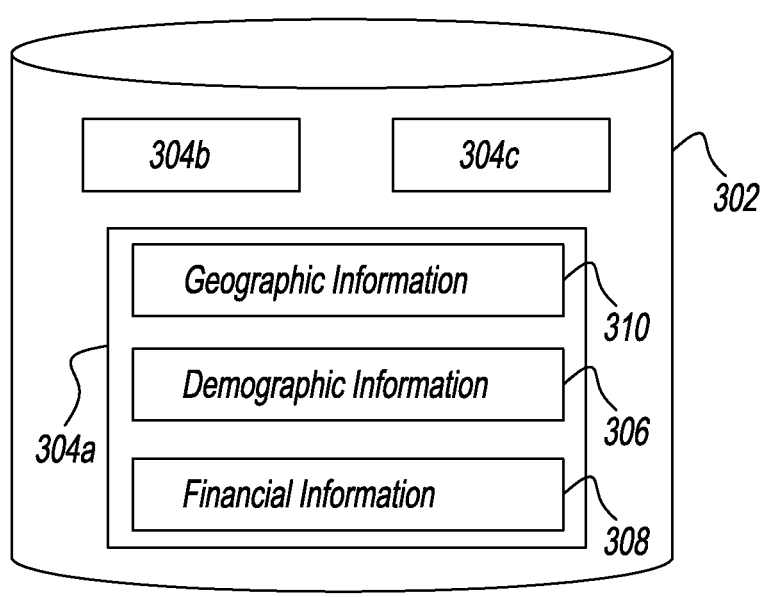
FIG. 3 is a block diagram illustrating a data set for use with the disclosed methods in accordance with exemplary embodiments.

FIG. 3 illustrates an exemplary dataset 302 for the storing, reviewing, and/or analyzing of a plurality of interaction associations. The dataset 302 may contain a plurality of entries (e.g., entries 304a, 304b, and 304c).

The demographic information 306 may include any demographic or other suitable information relevant to the particular application. For example, if a family restaurant is launching an advertising campaign and is requesting interaction associations of families with a spend propensity on restaurants, then the demographic information may include familial status, but not age. If a bar is launching an advertising campaign, then demographic information may include age, but not familial status. In some embodiments, the geographic information 310 may include geographic or other suitable information relevant to the particular application. Suitable types of information relevant for the selecting and supplying of interaction associations will be apparent to persons having skill in the relevant art. Likewise, the financial information 308 may include any financial information relevant to the particular application. For example, a dataset provided to advertisers in the food service industry may contain entries with financial information that includes a spend propensity for restaurants, but not a spend propensity for electronics.

Referring again to FIG. 2, a financial transaction processing company, for example, can identify audiences or targets 222 to receive offers. Audiences are developed for each target 224. The target is the dependent variable and interaction associations are the independent variable. The interaction association attributes are leveraged in developing audiences. Decision trees, Chi-Squared Automatic Interaction Detector (CHAID), Correlation Analysis, Market Basket Analysis, and the like can be leveraged in developing audiences.

The financial transaction processing company, for example, can create rules or interaction associations 226 containing interaction association attributes that are significant in predicting targets. For example, individuals that are likely to purchase at Macy's® in the next week include: Rule 1: live in the following zip codes AND like GAP® AND like Nordstrom® AND like movies AND like consumer electronics; and Rule 2: between the ages of 25-35 AND like Woman's Apparel AND like Bloomingdales® AND like jewelry AND like family restaurants.

In order to convey rules or interaction associations between a financial transaction processing company and a third party (e.g., social media company or other API vendor), for example, a standard format should be defined for the rules or interaction associations. Preferably, the financial transaction processing company and third party (e.g., social media company or other API vendor) work together to define the best format.

Once the format for the rules or interaction associations has been defined, the rules or interaction associations can be communicated to the third party 228 (e.g., social media company or other API vendor) for each audience and target. This enables the campaign execution for target offering 230.

The third party (e.g., social media company or other API vendor (Foursquare® and search companies)), for example, can act as an agent of the other party (e.g., the financial transaction processing company), in doing the following: on-board audience files, etc. into the social media platform, execute marketing campaigns for the other party (e.g., marketing for the payment card company), and provide campaign results to the other party.

Figure 4:
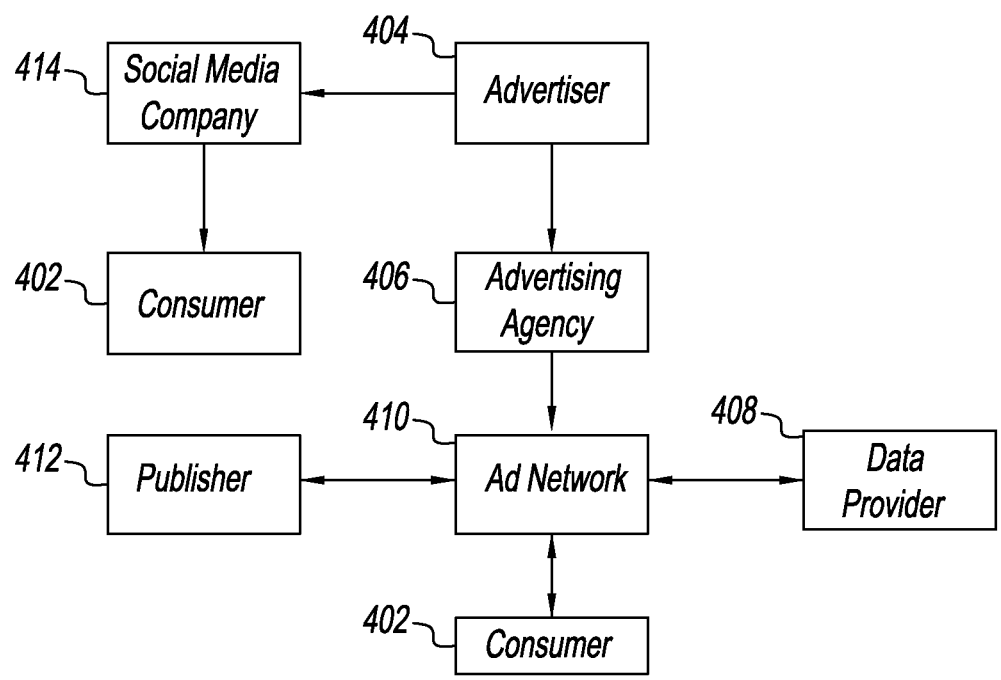
FIG. 4 is a block diagram illustrating a system for the distribution of audiences to a third party requester.

FIG. 4 illustrates a system architecture for the distribution audiences to a third party. The preferred system includes an advertiser 404 (e.g., a merchant or a financial transaction processing company such as a payment card company) who wishes to advertise to an ideal consumer 402 through a social media company 414. Alternatively, the system may include an advertiser 604 (e.g., a merchant or a financial transaction processing company such as a payment card company) who wishes to advertise to an ideal consumer 402, for example, a sporting goods store may wish to advertise to sports enthusiasts, a family restaurant may wish to advertise to families with a spend propensity for restaurants, or a landscaping service may wish to advertise to new homeowners. The advertiser 404 may contact an advertising agency 406 in their efforts to reach their ideal consumers through use of the interaction associations generated in accordance with the method of this disclosure.

The advertising agency 406 may refine the ideal market of consumers on behalf of the advertiser 404. For example, the advertising agency 406 may refine the family restaurant's ideal family with a spend propensity for restaurants to be a more specific ideal consumer, such as a family of at least three members above the age of 12, with an income between $30,000 and $59,999, living in eight possible postal codes near the restaurant, and with a spend propensity for restaurants. The advertising agency 406 may also develop campaigns or create a plan for advertising on behalf of the advertiser 404, or originate offers on behalf of, or with, the advertiser 404. The audiences and interaction associations generated by the advertiser 404 will be used by the advertising agency 406 in targeting the advertising. The nature of the work of an advertising agency will be apparent to persons having skill in the relevant art.

The advertising agency 406 may provide an ad network 410, or other third party provider, with information regarding the advertising campaign, such as attributes of the refined ideal consumer or offers the advertiser 404 is interested in distributing to its ideal consumer. The ad network 410 may contact a data provider 408 (e.g., the financial transaction processing company) and may provide the data provider 408 with any information necessary for the creation of further audiences or interaction associations that represent the ideal consumer of the advertiser 404. The data provider 408 may provide the ad network 410 with a report (e.g., of ideal consumer interaction associations or audiences). The ad network 410 may also contact a publisher 412. The publisher 412 may run a website or otherwise have advertising space available. The publisher 412 may make the advertising space available to the ad network 410, who may run advertisements or display offers through the publisher 412 and to the consumer 402.

The ad network 410, or other third party provider, may also obtain data on the success or other parameters of the advertising or offers displayed to the consumer 402. The ad network 410 may provide this data to the data provider 408. The data provider 408 may apply the data received from the ad network 410 to selected interaction associations to generate an audience, which may be provided to the ad network 410. The ad network 410 may also provide this information or any received audiences to the advertising agency 406 and/or the advertiser 404 (e.g., to inform of the success or failure of the advertising campaign).

Figure 5:
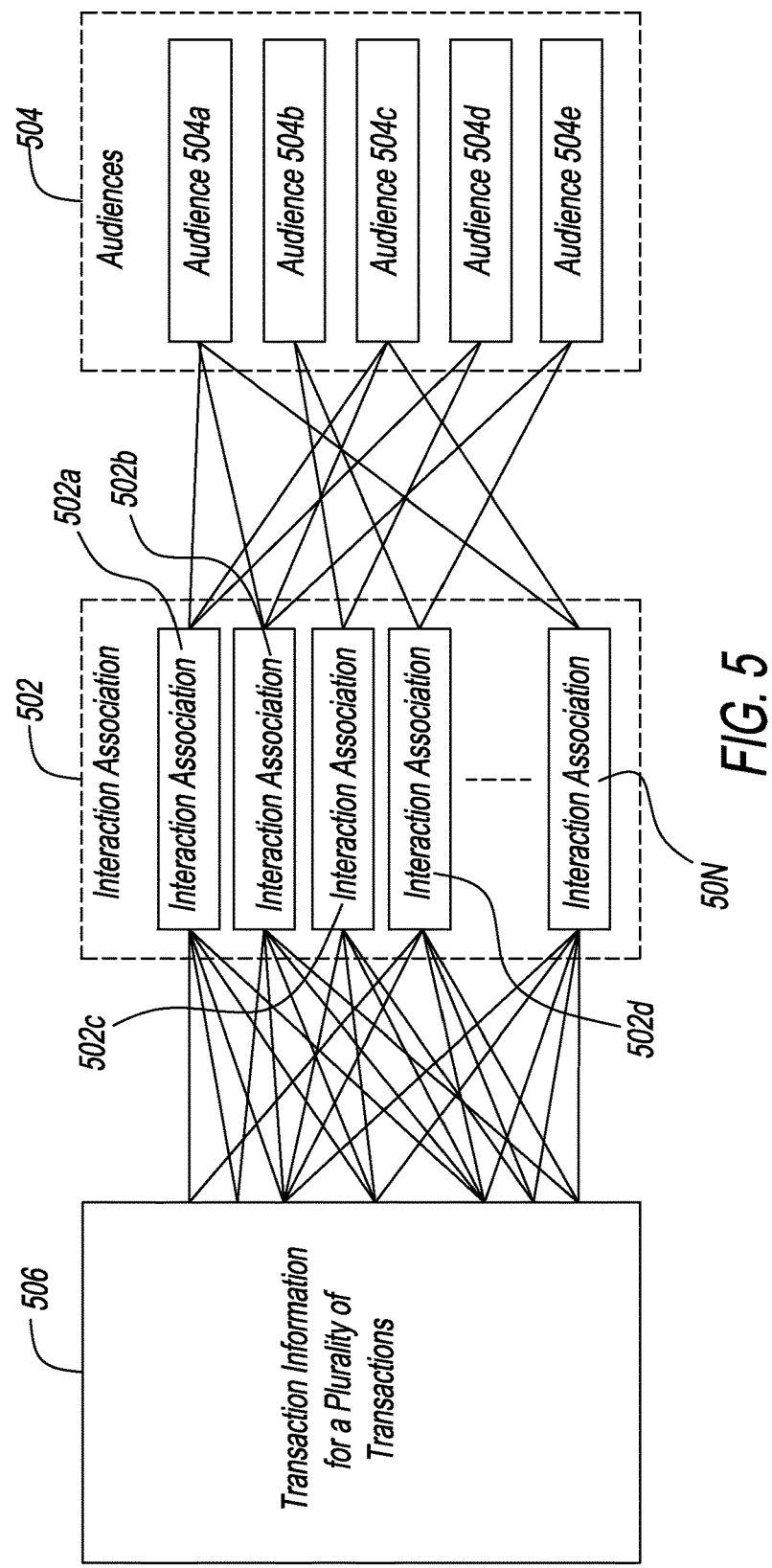
FIG. 5 a block diagram illustrating the creation of interaction associations and audiences from transaction information in accordance with exemplary embodiments.

FIG. 5 illustrates the creation of a plurality of audiences 504 from a plurality of interaction associations 502, which are themselves created based on transaction information for a plurality of transactions 506.

Audiences may be a combined group of interaction associations that may be applied to an external set of data (e.g., provided by a third party, such as the ad network 410). For example, an audience may consist of a plurality of interaction associations corresponding to geographical and demographical data provided by a merchant (e.g., for the purposes of advertising), as applied to the external data set by matching characteristics in respective interaction associations to characteristics of entities in the second plurality of entities to identify an audience of entities that have a propensity to carry out certain activities based on the selected activities criteria and/or selected characteristics criteria used in forming the interaction associations, to enable the third party to contact the audience of entities to induce desired activities in at least a portion of the entities in the audience. In a further example, if the external set of data includes a plurality of postal codes (e.g., corresponding to the geographic area surrounding the merchant), the audience may consist of all interaction associations for the plurality of postal codes.

In some embodiments, an audience may consist of a group of interaction associations that do not share any common parameters. Audience parameters or attributes may be based on attributes received (e.g., from a third party advertiser). It will be apparent to persons having skill in the relevant art that the number of potential audiences for a group of interaction associations may be as large or larger than the group of interaction associations itself. An audience may also be a combined grouping of entities, such as a group of entities identified by a third party, which may be matched to a group of interaction associations in order to identify potential activities characteristics of the entities in the audience based on activities and/or characteristics data of the corresponding interaction associations.

As illustrated in FIG. 5, and discussed above, the plurality of interaction associations 502 may be created based on the transaction information of the plurality of transactions 506. The plurality of transactions 506 may consist of potentially billions of transactions, the information for which may be utilized in the creation of the plurality of interaction associations 502. The transaction information may be obtained by the financial processing tracking agency (payment card company network 150 in FIG. 1), and may be stored in one or more databases.

The transaction information used for the creation of interaction associations may be selected based on attributes (e.g., received from a third party advertiser). The financial transaction processing company, e.g., payment card company network, may select particular financial transactions or financial accounts for the creation of interaction associations. The financial transaction processing company, e.g., payment card company, may create a plurality of interaction associations 502, which may include interaction association 502a, interaction association 502b, and up to an interaction association 502N, where N may represent the total number of the interaction associations in the plurality of interaction associations 502.

The financial transaction processing company may create the plurality of audiences 504 based on the plurality of interaction associations 502 as applied to a received external data set. The number of audiences in the plurality of audiences 504 may be at least as large as the number of interaction associations in the plurality of interaction associations 502. In an exemplary embodiment, the number of audiences is less than the number of interaction associations. In FIG. 5, the plurality of audiences 504 is illustrated as including five audiences, audiences 504a-504e (e.g., based on five different sets of external data). Each audience may be comprised of multiple interaction associations. For example, audience 504a may include interaction associations 502a, 502b, and 502N. Each of the multiple interaction associations in the audience may have a common parameter. For instance, the interaction associations 502a, 502b, and 502N that comprise audience 504a may each be defined by the same postal code, or same age group, or both. The parameters used in the creation of audiences may be based on the goal of the audience creation (e.g., the advertisings goals of a third party advertiser).

Audiences may represent a wide variety of categories and attributes. In one embodiment, audiences may be created based on spending propensity of spending index in a particular industry. Industries may include, as will be apparent to persons having skill in the relevant art, restaurants (e.g., fine dining, family restaurants, fast food), apparel (e.g., women's apparel, men's apparel, family apparel), entertainment (e.g., movies, professional sports, concerts, amusement parks), accommodations (e.g., luxury hotels, motels, casinos), retail (e.g., department stores, discount stores, hardware stores, sporting goods stores), automotive (e.g., new car sales, used car sales, automotive stores, repair shops), travel (e.g., domestic, international, cruises), etc. Each industry may include a plurality of audiences (e.g., based on location, income groups, etc.).

Audiences may also be based on predictions of future behavior. For instance, a financial transaction processing company may analyze financial account information and behavioral information to predict future behavior of an interaction association of entities. For example, the financial transaction processing company may determine that entities in interaction association 502a have a high spending propensity for electronics. An audience (e.g., the audience 504a) may consist of all interaction associations (e.g., the interaction associations 502a, 502b, and 502N) which contain entities with a high spending propensity for electronics.

Audiences may also be aligned with other similar audiences. Similar audiences may be determined by similarities in, for example, the audience parameters (e.g., nearby postal codes), or in the entities contained in the interaction associations (e.g., a larger number of cardholders common to both audiences). In one embodiment, the financial transaction processing company may create audiences based on received parameters, which may be aligned to audiences created by a third party on the same parameters yet include different entities or interaction associations. The process and parameters for the alignment of audiences may be dependent on the application of the audiences, as will be apparent to persons having skill in the relevant art.

A plurality of interaction associations may be generated. In some embodiments, each interaction association may include at least ten entities, which each may have at least one attribute in common. In an exemplary embodiment, the generating of interaction associations may include generating interaction associations based on the following attributes: postal code, bucketed age group, bucketed income group, presence of children, and gender indicator. Any interaction association with less than a given number of entities (e.g., ten) may be deleted.

A financial transaction processing company may analyze the generated interaction associations (e.g., by analyzing the stored data for each entity comprising the interaction association) for behavioral information (e.g., spend behaviors and propensities). In some embodiments, the behavioral information may be represented by a behavioral score. Behavioral information may be assigned to each corresponding interaction association, or may be assigned to an audience of interaction associations.

Interaction associations or behavioral information may be updated or refreshed at a specified time (e.g., on a regular basis or upon request of a party). Updating interaction associations may include updating the entities included in each interaction association with updated demographic data and/or updated financial data. Interaction associations may also be updated by changing the attributes that define each interaction association, and generating a different set of interaction associations. The process for updating behavioral information may depend on the circumstances regarding the need for the information itself.

Figure 6:
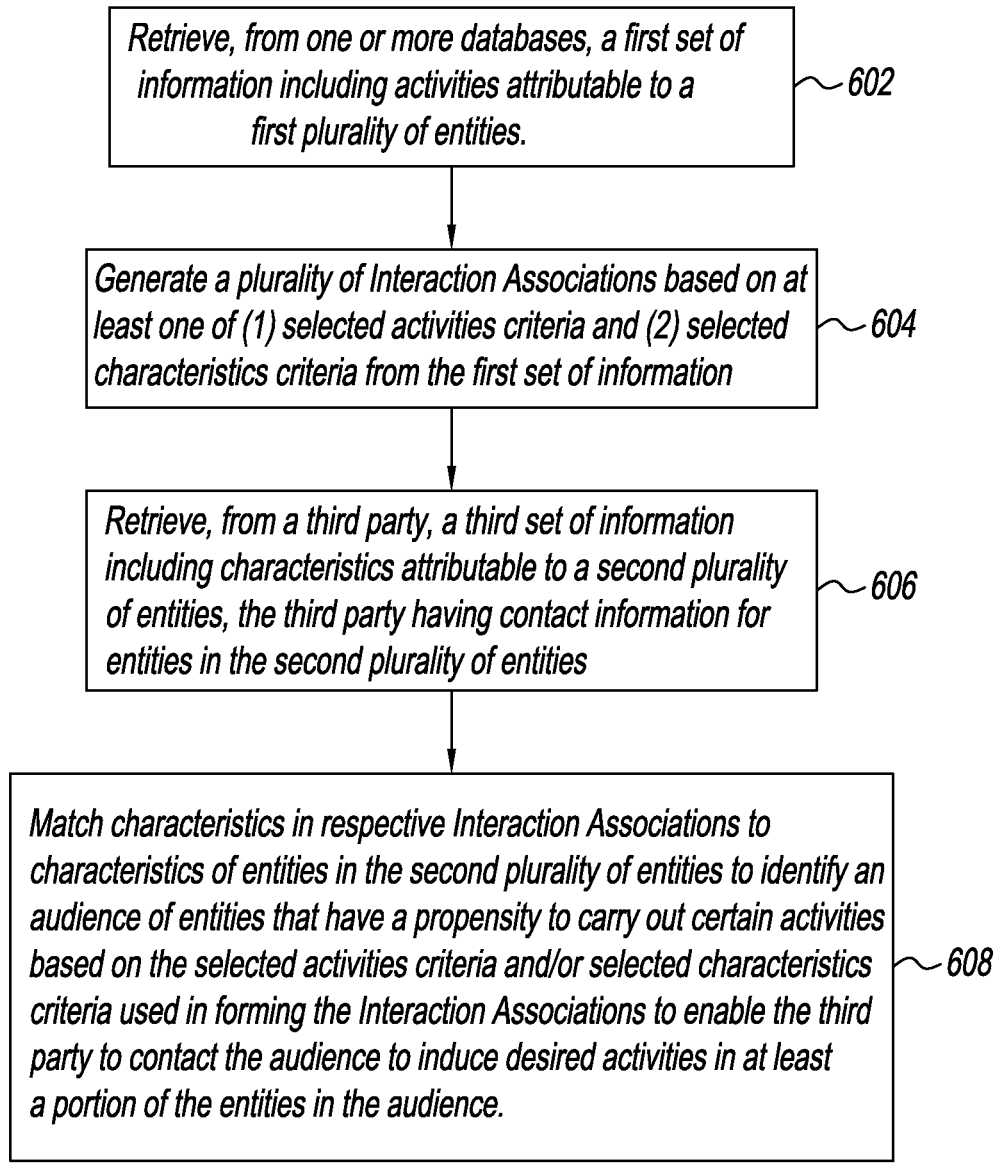
FIG. 6 is a flow chart illustrating an exemplary method for generating audiences of a population of entities for the purpose of making a targeted offer to the audiences.

FIG. 6 illustrates a method of generating audiences of a population of entities for the purpose of making a targeted offer to the audiences.

In step 602, a processing company (e.g., the financial transaction processing company part of the payment card company network 150 of FIG. 1) may retrieve, from one or more databases a first set of information including activities attributable to a first plurality of entities. In one embodiment, the activities may include financial transactions associated with the first plurality of entities. In a further embodiment, the activities may include behavioral information related to the financial transactions, such as spending propensities (e.g., in a particular industry, at a particular merchant, etc.), likelihood to spend, or other behaviors.

In step 604, the financial transaction processing company may generate a plurality of interaction associations based on at least one of (1) selected activities criteria and (2) selected characteristics criteria from the combined set of information. In an exemplary embodiment, each interaction association may include at least ten entities. In a further embodiment, the selected characteristics criteria may be based on characteristics attributable to each of the at least ten entities included in the interaction association. In another embodiment, all of the at least ten entities may include at least one attributed characteristic in common In step 606, the financial transaction processing company may receive, from a third party (e.g., a social media company), a third set of information including characteristics attributable to a second plurality of entities, the third party having contact information for entities in the second plurality of entities. In one embodiment, the first plurality of entities and the second plurality of entities may or may not have common entities. In another exemplary embodiment, the characteristics attributable to the second plurality of entities and the characteristics attributable to the first plurality of entities may include the same characteristics.

In step 608, the financial transaction processing company may match characteristics in respective interaction associations to characteristics of entities in the second plurality of entities to identify an audience of entities that have a propensity to carry out certain activities based on the selected activities criteria and/or selected characteristics criteria used in forming the interaction associations, to enable the third party to contact the group to induce desired activities in at least a portion of the entities in the audience. In one embodiment, matching the characteristics in respective interaction associations may include matching all of the characteristics of entities in the second plurality of entities with characteristics of the respective interaction associations. In an embodiment, with respect to entities having a propensity to carry out certain activities, the certain activities may be defined by the third party. In one embodiment, the certain activities may include the desired activities. In yet another embodiment, the audience may contain at least one entity.

Although the above methods and processes are disclosed primarily with reference to financial data and spending behaviors, it will be apparent to persons having skill in the relevant art that interaction associations may be beneficial in a variety of other applications. Interaction associations may be useful in the evaluation of consumer data may need to be protected.

For instance, interaction associations may have useful applications in measuring the effectiveness of advertising or other consumer campaigns. A third party may desire to discover the effectiveness of a particular advertising campaign in reaching a specific set of consumers.

For example, a consumer electronics store may want to know the effectiveness of an advertising campaign initiated by the store and directed towards male consumers of a specific age and income group. The store may provide the financial transaction processing company with the demographic (e.g., demographical and geographical) data corresponding to the market. The financial transaction processing company may identify interaction associations with corresponding demographic data and summarize relevant spend behaviors for the identified interaction associations. Summary of the relevant spend behaviors (e.g., showing an increase or decrease in spending at the consumer electronic store) for each interaction association (e.g., including the interaction association or interaction associations of ideal consumers) may be provided to the consumer electronics store.

Interaction association data may also be combined or matched with other sources of data. For example, other transaction processing agencies, advertising firms, advertising networks, publishers, etc. may provide information on consumer groupings of their own. The financial transaction processing company may link or match the received consumer groupings, such as by matching groupings to generated interaction associations based on geographical or demographical data.

Systems and methods disclosed herein may also have applications to the mobile communication device industry. For example, it may be common practice that mobile communication carriers provide mobile communication devices and services to consumers on a renewable contract for a specified time period (e.g., two years). The financial transaction processing company may be able to analyze spending behaviors for financial accounts to generate an interaction association or audience of individuals who may be nearing a renewal term on a contract with a mobile communication carrier (e.g., by identifying when a mobile communication device was purchased or two years of recurring payments to a mobile communication carrier). The audience may be provided to a mobile carrier as an ideal consumer base representing consumers in a position to change mobile communication carriers or take advantage of new contract offers. As another example, business travelers may be identified as a result of spending behaviors (e.g., weekday spending, a plurality of hotel, restaurant, and airline transactions, etc.) for generation of a corresponding audience of interaction associations. Other beneficial applications of the systems and methods disclosed herein will be apparent to persons having skill in the relevant art(s).

Methods for the creation of interaction associations and audiences may also be beneficial in the healthcare industry. For example, in hospitals, pharmaceutical companies, and insurance companies are all highly regulated. The creation of interaction associations and analysis of behavioral information may greatly benefit these entities. An insurance company may have a database of all of its customers, including demographic data and other health-related data. The insurance company may use a linking environment to combine the demographic and health data with relevant data provided by a hospital. Relevant data may include prescription information, illness information, etc. The insurance company may combine the information and generate interaction associations based on the demographic data health-related data, which may be analyzed to obtain potential health issues for entities in each interaction association or other useful information.

A pharmaceutical company may have demographical data on potential customer, and provide the geographical data to the insurance company. The insurance company may match each potential customer to an interaction association, and apply analyzed information, such as potential health issues for entities of that interaction association, to the potential customer.

Interaction associations may also be useful in political campaign financing. Interaction associations may also be beneficial in the profiling of potential consumers for the purposes of offering a payment card (e.g., a credit card). For example, assignee MasterCard International Incorporated has developed a method for making payment cards responsive to consumer needs based on market segment characteristics, such as demographics and behavioral information, as disclosed in U.S. Patent Publication No. 2008/0133325 to De et al. (originally filed as U.S. patent application Ser. No. 11/755,288 on May 30, 2007). Interaction associations may be used to identify consumer needs based on demographics and behavioral information in a much more efficient, more accurate fashion.

Figure 7:
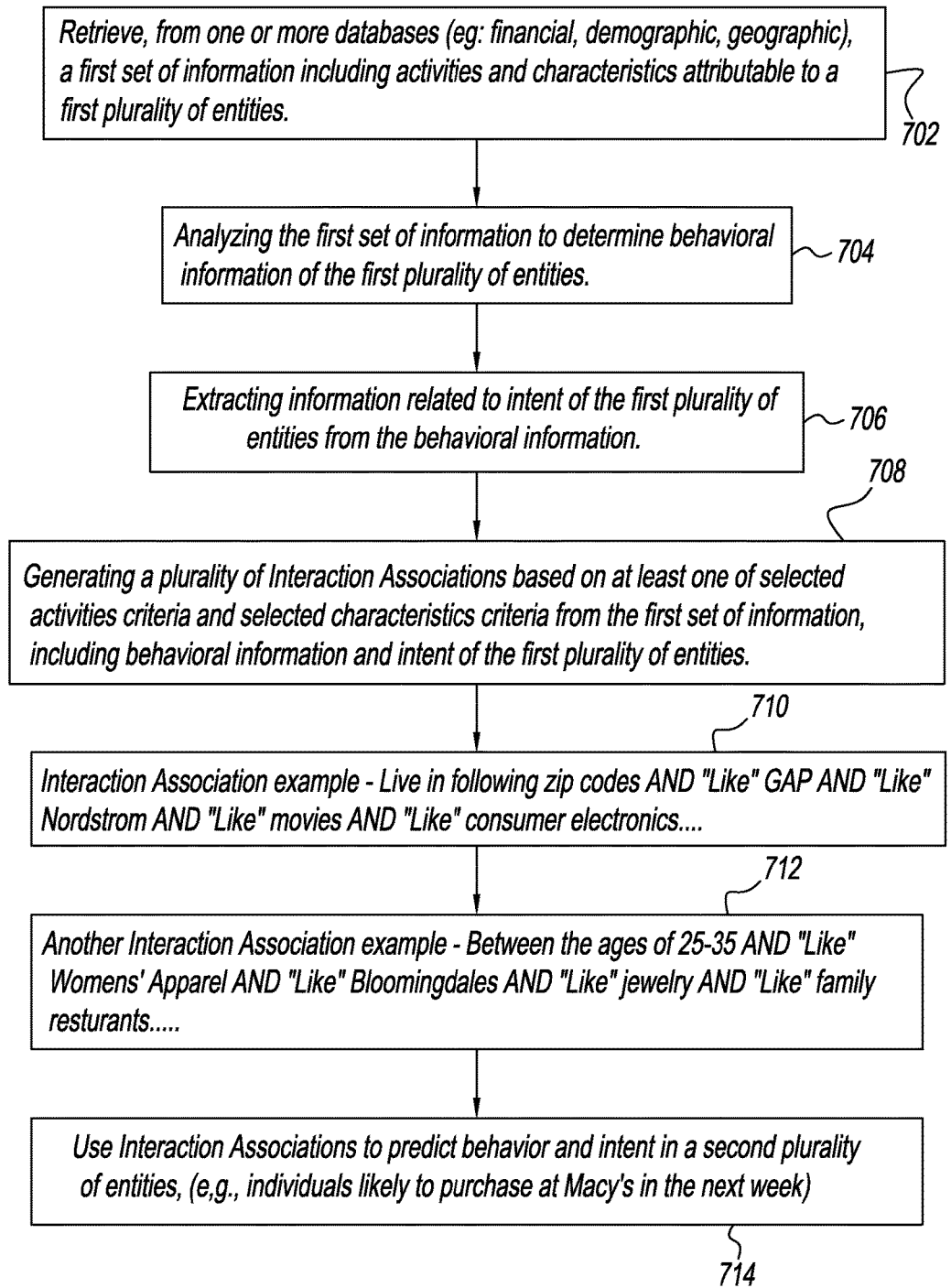
FIG. 7 is a flow chart illustrating the creation and application of interaction associations.

FIG. 7 illustrates an exemplary method for the creation and application of interaction associations. In step 702, a processing company (e.g., the financial transaction processing company that is part of the payment card company network 150 of FIG. 1) retrieves, from one or more databases (e.g., financial, demographic, geographic) a first set of information including activities attributable to a first plurality of entities. In step 704, the processing company analyzes the first set of information to determine behavioral information of the first plurality of entities. In step 706, the processing company extracts information related to intent of the first plurality of entities from the behavioral information. In step 708, based on at least one of selected activities criteria and selected characteristics criteria from the first set of information including behavioral information and intent of the first plurality of entities, a plurality of interaction associations are generated.

In 710, one example of an interaction association is as follows: live in the following zip codes AND like GAP® AND like Nordstrom® AND like movies AND like consumer electronics . . . . In 712, another example of an interaction association is as follows: between the ages of 25-35 AND like woman's apparel AND like Bloomingdales® AND like jewelry AND like family restaurants . . . .

In step 714, the interaction associations are used to predict behavior and intent in a second plurality of entities (e.g., the above interaction association examples are used to predict individuals likely to purchase at Macy's® in the next week).

Where methods described above indicate certain events occurring in certain orders, the ordering of certain events may be modified. Moreover, while a process depicted as a flowchart, block diagram, etc. may describe the operations of the system in a sequential manner, it should be understood that many of the system's operations can occur concurrently or in a different order.

The terms "comprises" or "comprising" are to be interpreted as specifying the presence of the stated features, integers, steps or components, but not precluding the presence of one or more other features, integers, steps or components or groups thereof.

It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A method for making a targeted offer to an audience of a second plurality of entities, the method comprising:
    retrieving, by a processor, from one or more financial transaction databases of a payment card system, a first set of information including activities and characteristics attributable to a first plurality of entities, wherein the first set of information comprises financial transactions and geographic and demographic information from payment card transaction data;
    determining, by the processor, behavioral variable information of the first plurality of entities;
    extracting, by the processor, an intent of the first plurality of entities from the behavioral variable information;
    generating, by the processor, a plurality of interaction associations based on (a) at least one of selected activities criteria and selected characteristics criteria from the first set of information and (b) the behavioral variable information and the intent of the first plurality of entities;
    developing, by the processor, audiences of the second plurality of entities from one of the plurality of interaction associations using at least one methodology that is selected from the group consisting of: Decision Trees, Chi-Squared Automatic Interaction Detection (CHAID), Correlation Analysis, and Market Basket Analysis;
    generating prediction rules containing one or more of the interaction associations for predicting a target audience, wherein the target audience is a dependent variable and the one or more interaction associations are the independent variable, wherein the prediction rules are configured to, when run by a processor:
        match activities and characteristics of the second set information to the activities and characteristics of one of the plurality of interaction associations;
        predict behavior and intent of the second plurality of entities to carry out certain activities based on (a) the activities criteria and/or characteristics criteria and (b) the behavioral variable information and the intent of the first plurality of entities used in forming the interaction associations, thus yielding predicted behavior and intent; and
        present the targeted offer to the audience of the second plurality of entities based on the predicted behavior and intent of the second plurality of entities;
    defining a format for the prediction rules that is conveyable to a third party web-based social network or API vendor;
    conveying to the third party, by the processor and using the defined format of the web-based social network or API vendor, the prediction rules configured to enable the third party to identify a second set of information including activities and characteristics attributable to the second plurality of entities.

2. The method of claim 1, further comprising: predicting the behavior and the intent in the second plurality of entities using the interaction associations.

3. The method of claim 1 wherein the second plurality of entities are people and/or businesses, and wherein the activities attributable to the first plurality of entities are the financial transactions associated with the first plurality of entities, and the characteristics attributable to the first plurality of entities are the demographics and/or geographical characteristics of the first plurality of entities.

4. The method of claim 1 wherein the selected characteristics criteria of each of the plurality of interaction associations is based on characteristics attributable to each of the entities included in the interaction association.

5. The method of claim 1, the matching characteristics of respective interaction associations to characteristics of entities in the second plurality of entities further comprising: matching all of the characteristics of entities in the second plurality of entities.

6. The method of claim 1 wherein the audience is within a web-based social network.

7. The method of claim 6 wherein the web-based social network has contact information for entities in the second plurality of entities.

8. The method of claim 1 wherein the behavioral variable information comprises a spend behavior variable.

9. The method of claim 1, the first plurality of entities further comprising payment card holders.

10. The method of claim 1, the second plurality of entities further comprising social network users of the web-based social network.

11. The method of claim 1, the third party further comprising a web-based social network.

12. The method of claim 11 wherein the web-based social network is selected from Facebook®, Pinterest®, Twitter®, LinkedIn®, MySpace®, and Google®.

13. A method for making a targeted offer to an audience within a web-based social network, the method comprising:
   retrieving, by a processor, from one or more financial transaction databases of a payment card system, a first set of information including activities and characteristics attributable to a first plurality of entities, wherein the first set of information comprises financial transactions and geographic and demographic information from payment card transaction data;
   determining, by the processor, behavioral variable information of the first plurality of entities;
   extracting, by the processor, an intent of the first plurality of entities from the behavioral variable information;
   generating, by the processor, a plurality of interaction associations based on (a) at least one of selected activities criteria and selected characteristics criteria from the first set of information and (b) the behavioral variable information and the intent of the first plurality of entities;
   deriving, by the processor, audiences of the second plurality of entities from one of the plurality of interaction associations using at least one methodology that is selected from the group consisting of: Decision Trees, Chi-Squared Automatic Interaction Detection (CHAID), Correlation Analysis, and Market Basket Analysis;
   generating prediction rules containing one or more of the interaction associations for predicting a target audience, wherein the target audience is a dependent variable and the one or more interaction associations are the independent variable, wherein the prediction rules are configured to, when run by a processor:
      match activities and characteristics of the second set of information to the activities and characteristics of the interaction associations;
      predict behavior and intent of the second plurality of entities to carry out certain activities based on (a) the activities criteria and/or characteristics criteria and (b) the behavioral variable information and the intent of the first plurality of entities used in forming the interaction associations, thus yielding predicted behavior and intent of the second plurality of entities; and
      present the targeted offer to an audience of the second plurality of entities within the social network based on the predicted behavior and intent of the second plurality of entities;
   defining a format for the prediction rules that is conveyable to a web-based social network; and
   conveying to the social network, by the processor and using the defined format, the prediction rules configured to enable the social network to identify a second set of information including activities and characteristics attributable to the second plurality of entities within the social network.

14. A system for making a targeted offer to an audience of a second plurality of entities, the system comprising:
   one or more financial transaction databases of a payment card system configured to store a first set of information including activities and characteristics attributable to a first plurality of entities, wherein the first set of information comprises financial transactions and geographic and demographic information from payment card transaction data;
   a processor configured to
   determine behavioral variable information of the first plurality of entities;
   extract an intent of the first plurality of entities is extracted from the behavioral information;
      generate a plurality of interaction associations based on (a) at least one of selected activities criteria and selected characteristics criteria from the first set of information and (b) the behavioral variable information and the intent of the first plurality of entities;
   develop, by the processor, audiences of the second plurality of entities from one of the plurality of interaction associations using at least one methodology that is selected from the group consisting of: Decision Trees, Chi-Squared Automatic Interaction Detection (CHAID), Correlation Analysis, and Market Basket Analysis;
   generate prediction rules containing one or more of the interaction associations for predicting a target audience, wherein the target audience is a dependent variable and the one or more interaction associations are the independent variable, wherein the prediction rules are configured to, when run by a processor:
      match activities and characteristics of the second set of information to the activities and characteristics of the interaction associations;
      predict behavior and intent of the second plurality of entities to carry out certain activities based on (a) the activities criteria and/or characteristics criteria and (b) the behavioral variable information and the intent of the first plurality of entities used in forming the interaction associations, thus yielding predicted behavior and intent of the second plurality of entities; and
      present the targeted offer to an audience of the second plurality of entities based on the predicted behavior and intent of the second plurality of entities;
   define, for the processor, a format for the prediction rules that is conveyable to a third party web-based social network or API vendor; and
   convey to the third party web-based social network or API vendor in the defined format the prediction rules configured to enable the third party to identify a second set of information including activities and characteristics attributable to the second plurality of entities.

15. The system of claim 14 wherein the interaction associations are configured to predict behavior and the intent in the second plurality of entities.

16. The system of claim 14 wherein the second plurality of entities are people and/or businesses, the activities attributable to the first plurality of entities are the financial transactions associated with the first plurality of entities, and the characteristics attributable to the first plurality of entities are demographics and/or geographical characteristics of the first plurality of entities.

17. The system of claim 14 wherein the selected characteristics criteria of each of the plurality of interaction associations is based on characteristics attributable to each of the entities included in the interaction association.

18. The system of claim 14, further comprising: the match characteristics of respective interaction associations to characteristics of entities in the second plurality of entities includes, when the predictive rules are run by the processor, matching all of the characteristics of entities in the second plurality of entities.

19. The system of claim 14 wherein the audience is within the web-based social network.

20. The system of claim 19 wherein the web-based social network has contact information for entities in the second plurality of entities.

21. The system of claim 14 wherein the first set of information comprises payment card transactions and demographic information.

22. The system of claim 14 wherein the first plurality of entities comprises payment card holders.

23. The system of claim 14 wherein the second plurality of entities comprise social network users of the web-based social network.

24. The system of claim 14 wherein the third party is a social network.

25. The system of claim 24 wherein the web-based social network is selected from Facebook®, Pinterest®, Twitter®, LinkedIn®, MySpace®, and Google®.

26. A system for making a targeted offer to an audience within a social network, the system comprising:
 one or more financial transaction databases of a payment card system configured to store a first set of information including activities and characteristics attributable to a first plurality of entities, wherein the first set of information comprises financial transactions and geographic and demographic information from payment card transaction data;
 a processor configured to
 determine behavioral information of the first plurality of entities;
 extract an intent of the first plurality of entities from the behavioral variable information;
 generate a plurality of interaction associations based on (a) at least one of selected activities criteria and selected characteristics criteria from the first set of information and (b) the behavioral variable information and the intent of the first plurality of entities;
 develop, by the processor, audiences of the second plurality of entities from one of the plurality of interaction associations using at least one methodology that is selected from the group consisting of: Decision Trees, Chi-Squared Automatic Interaction Detection (CHAID), Correlation Analysis, and Market Basket Analysis;
 generate prediction rules containing one or more of the interaction associations for predicting a target audience, wherein the target audience is a dependent variable and the one or more interaction associations are the independent variable, wherein the prediction rules are configured to, when run by a processor:
  match activities and characteristics of the second set of information to the activities and characteristics of the interaction associations;
  predict behavior and intent of the second plurality of entities to carry out certain activities based on (a) the activities criteria and/or characteristics criteria and (b) the behavioral variable information and the intent of the first plurality of entities used in forming the interaction associations, thus yielding predicted behavior and intent of the second plurality of entities; and
  present the targeted offer to an audience of the second plurality of entities within the social network based on the predicted behavior and intent of the second plurality of entities;
 define, for the processor, a format for the prediction rules that is conveyable to a web-based social network; and
 convey in the defined format to the social network the prediction rules configured to enable the web-based social network to identify a second set of information including activities and characteristics attributable to the second plurality of entities.

* * * * *